US011758210B1

(12) United States Patent
Garib Herrera et al.

(10) Patent No.: US 11,758,210 B1
(45) Date of Patent: Sep. 12, 2023

(54) AUDIENCE MATCHING AND CONTENT SELECTION FOR UNIDENTIFIED AUDIENCES

(71) Applicant: Amazon Technologies, Inc., Seattle, WA (US)

(72) Inventors: Cristobal Garib Herrera, Seattle, WA (US); Junichi Suzuki, Bellevue, WA (US); Robert James Victor, Brookville, PA (US); Benjamin Erik Johnson, Oakville (CA); Xinyu Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 17/357,116

(22) Filed: Jun. 24, 2021

(51) Int. Cl.
*H04H 60/32* (2008.01)
*H04N 21/258* (2011.01)
*H04N 21/25* (2011.01)

(52) U.S. Cl.
CPC ..... *H04N 21/25883* (2013.01); *H04N 21/252* (2013.01)

(58) Field of Classification Search
CPC .................. H04N 21/25883; H04N 21/252
USPC ............................................................ 725/14
See application file for complete search history.

(56) References Cited

U.S. PATENT DOCUMENTS

| | | | |
|---|---|---|---|
| 10,380,633 B2* | 8/2019 | Morovati | H04N 21/44226 |
| 10,803,111 B2* | 10/2020 | Barlaskar | G06F 16/7328 |
| 2014/0046777 A1* | 2/2014 | Markey | G06Q 30/02 |
| | | | 705/14.66 |
| 2015/0235275 A1* | 8/2015 | Shah | G06Q 30/0269 |
| | | | 705/14.66 |
| 2021/0012378 A1* | 1/2021 | Demsey | H04L 67/04 |
| 2021/0027323 A1* | 1/2021 | Rao | G06Q 30/0241 |
| 2021/0357972 A1* | 11/2021 | VanLandeghem | G06N 20/00 |

* cited by examiner

*Primary Examiner* — Jefferey F Harold
*Assistant Examiner* — Sahar Aqil Riaz
(74) *Attorney, Agent, or Firm* — Eversheds Sutherland (US) LLP

(57) ABSTRACT

Devices, systems, and methods are provided for demographic matching and content selection for unidentified audiences. A method may include receiving, by a first device of a first device type, a request to present first content to a user of a first audience using a second device; determining a time at which the first content is to be presented to the first audience using the second device; identifying a second audience to which the second content is to be presented using devices of the first device type during a time period that includes the time; determining a probability that the user belongs to an audience group that includes users of the second audience based on the second content, the time period, and a second device type of the second device; and causing selection of the first content or third content for presentation to the first audience.

20 Claims, 8 Drawing Sheets

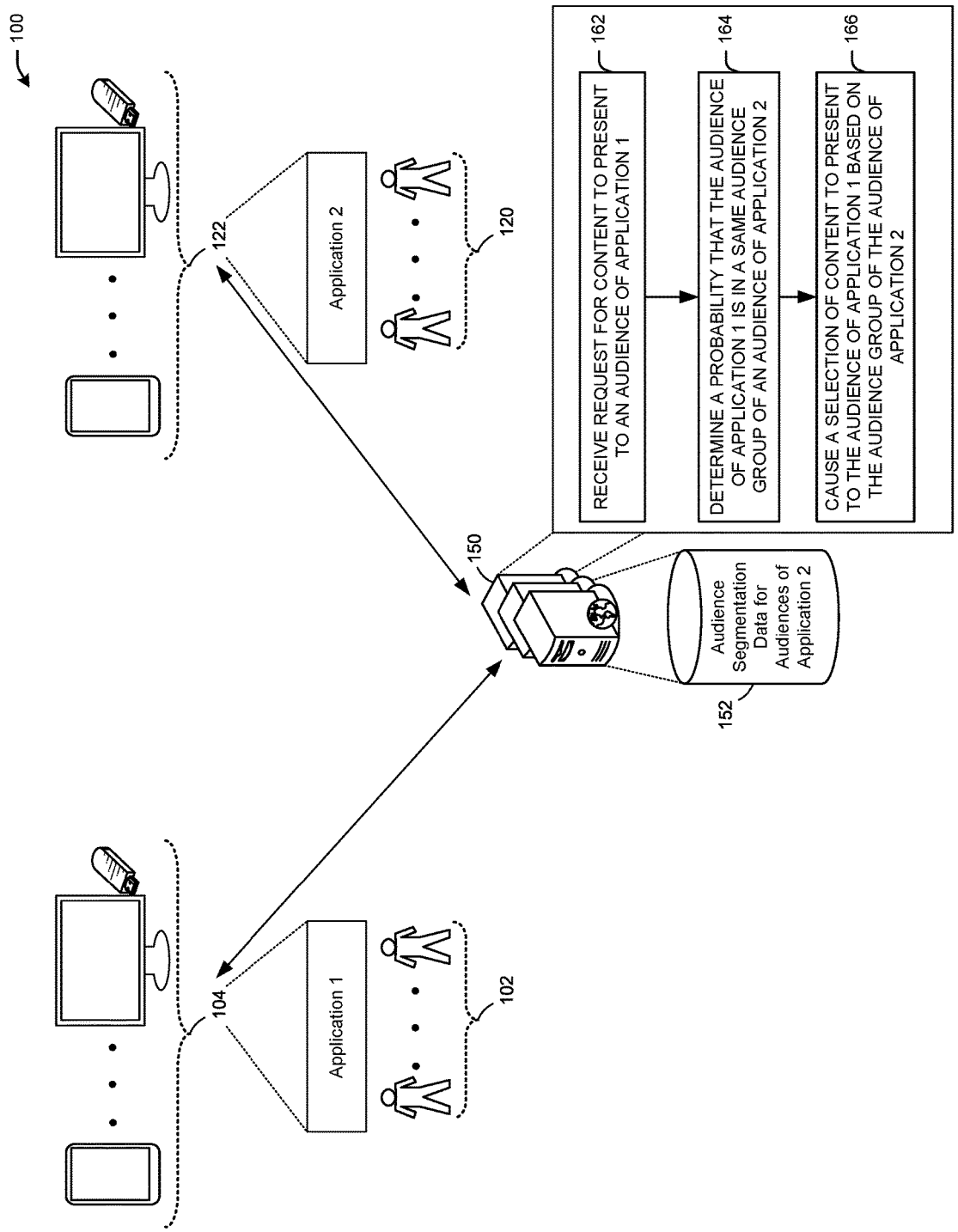

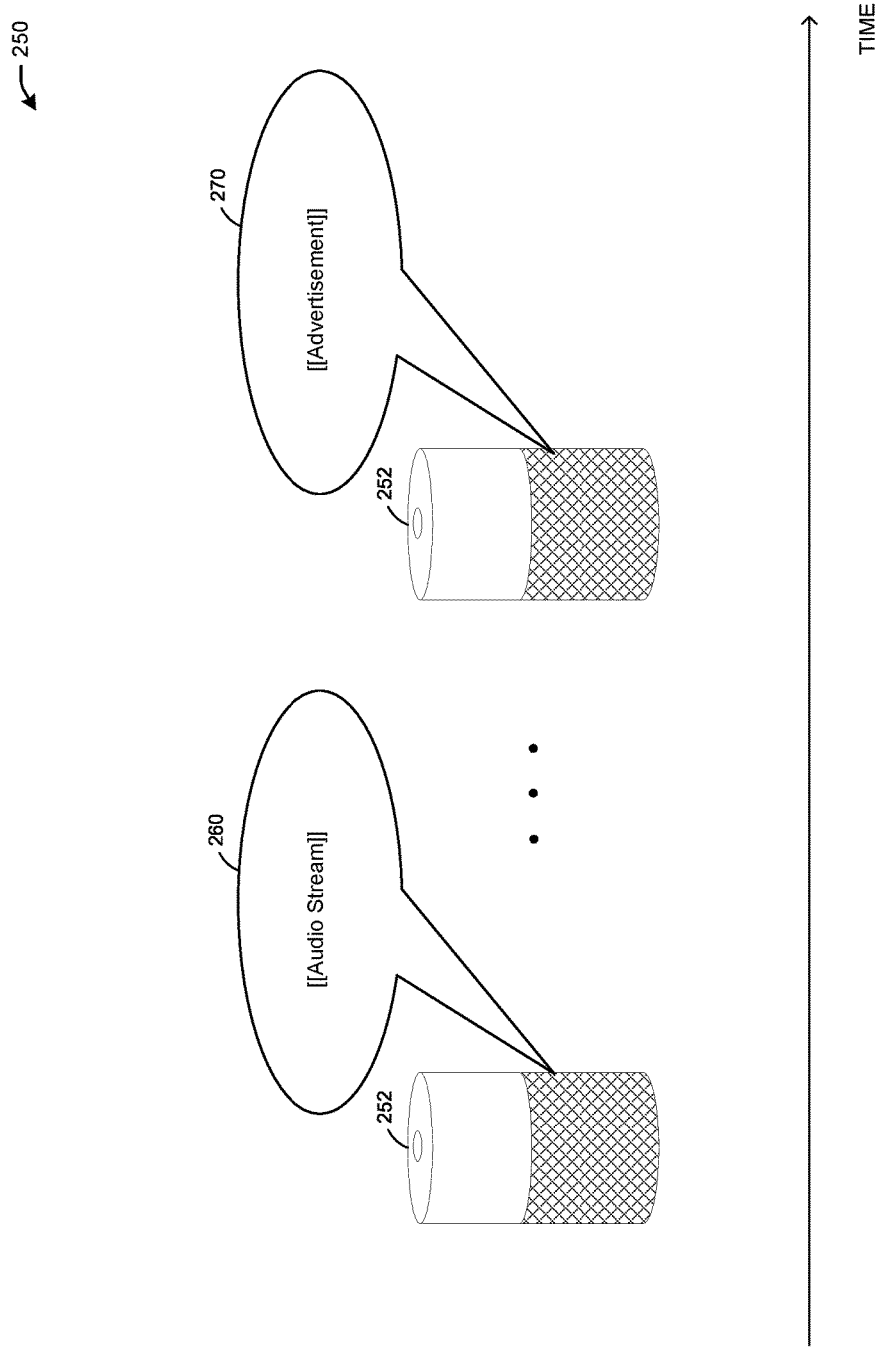

AUDIENCE MATCHING AND CONTENT SELECTION FOR UNIDENTIFIED AUDIENCES

BACKGROUND

People increasingly expect customized content to be presented to them, and are using multiple different types of applications and devices with different settings. In addition, privacy increasingly is a concern, and groups of users may be difficult to classify demographically in order to customize content presentation.

BRIEF DESCRIPTION OF THE DRAWINGS

FIG. 1 illustrates an example system for audience matching and content selection for unidentified audiences, in accordance with one or more example embodiments of the present disclosure.

FIG. 2B illustrates an example content presentation for unidentified audiences, in accordance with one or more example embodiments of the present disclosure.

Figure 2A:
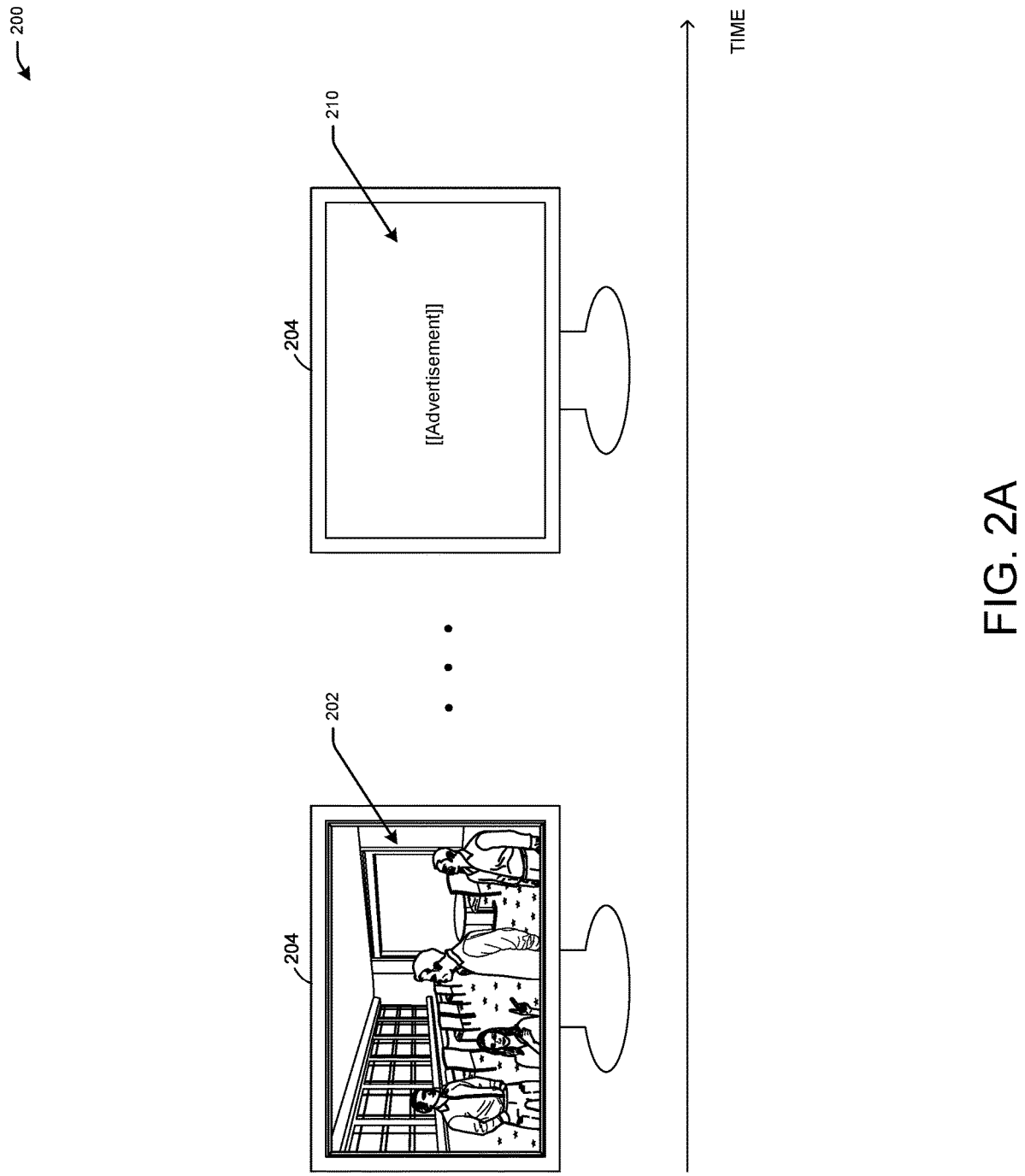
FIG. 2A illustrates an example content presentation for unidentified audiences, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for demographic matching and content selection for unidentified audiences.

Customized selection and presentation of content often rely on the use of identifiers to determine information about users of devices and applications (e.g., demographic information). Cookies, device identifiers (e.g., unique device identifiers, medium access control addresses, international mobile equipment identities, etc.), web beacons/tags, and application platform identifiers are examples of identifiers that may be specific to a particular device or application, and that may be used to determine information about groups of users (e.g., audiences) for the purpose of selecting and presenting content to them.

However, applications increasingly are becoming available for use on multiple different devices. For example, a user may execute the same video streaming application on a smartphone, tablet, and smart television, and may access the same video streaming application using a web browser.

Persistent identifiers have been used to identify a user across multiple devices and applications (e.g., smartphones, tablets, televisions, game consoles, web applications, etc.). When a person logs into a user account, the person may be recognized regardless of the device or application used due to the use of a persistent identifier. In this manner, persistent identifiers are deterministic rather than probabilistic, and are not limited to a particular device or application.

Persistent identifiers may allow for aggregate classification of audiences (e.g., content viewers) so that content selected for presentation to the audiences may be customized. For example, rather than relying on user surveys in which audiences provide demographic information used to determine the age, gender, location, and the like about audiences viewing any particular content, persistent identifiers allow for classification of aggregate audiences without having to query audience members.

However, people value privacy, and because people increasingly are using applications on multiple different devices that may not be able to share audience demographic and/or other audience segmentation information (e.g., audience segmentation data including demographic data, behavioral data, and lifestyle data) with each other, the ability to tailor the content presented to users is becoming more challenging. For example, on some devices, each application may prompt a user to opt into or out of the use of a user identifier to be shared with other applications for tracking purposes, and content customization systems may not have access to audience segmentation data for some audiences for which the content customization systems may facilitate the selection of customized content.

There is, therefore, a need for enhanced identification of audience information across multiple devices.

In one or more embodiments, content may be targeted for an audience for which a device does not have access to an identifier that maps to audience metrics (e.g., audience segmentation information). For example, some systems may receive a request to present an advertisement to an audience, and the system may use an identifier (e.g., a persistent identifier) that may map to data classifying the audience (e.g., demographic information or other audience segmentation information). However, the system sometimes may not have access to the identifier or to other user survey data indicating user demographics or other audience segmentation data (e.g., unidentified audiences), and instead may rely on content consumption patterns of audiences that use a device that has access to the identifier. In particular, the system may use aggregate audience data (e.g., audience segmentation data) of an audience using a device with access to a persistent identifier as inputs to generate a classification of an audience for which there is no persistent identifier (e.g., an unrecognized audience). In this manner, audience segmentation data of a recognized audience that uses one type of device (e.g., a device of one brand) may be used to model an unrecognized audience that uses a different type of device (e.g., a device of a different brand) without sharing a persistent identifier or other identifier that provides audience segmentation data for the unrecognized audience. While advertising is one form of content that may be targeted based on audience data, customization of other content may apply the same technique (e.g., content personalization such as product or content recommendations, ratings for buyers and sellers, previously viewed content, purchase history, etc.).

In one or more embodiments, the system may group users (e.g., of devices, applications, etc.) into segments (or groups) that define subgroups within an audience, the subgroups having one or more characteristics in common. For example, an audience may be segmented using demographic segmentation (e.g., based on age ranges and gender), behavioral segmentation (e.g., based on strong or weak user loyalty to a product or service, whether a user is a repeat user or first-time user, whether the user is in the market for a particular product), lifestyle segmentation (e.g., whether a user is an enthusiast for a particular activity, food, health-related goals, etc.). In this manner, audience segmentation data may refer to audience data used to categorize users of an audience as belonging to one or multiple types of audience segments: demographic segments, behavioral segments, and lifestyle segments. In the present disclosure, an audience segment (or audience group) may refer to an audience subgroup that is categorized as a demographic group, a behavioral group, or a lifestyle group.

In one or more embodiments, the system may assume, for example, that audiences not recognized using persistent identifiers may behave similarly to audiences recognized by a persistent identifier. For example, it may be assumed that audiences of a television program using one device brand are similar to audiences of the same television program using another device brand. Therefore, because one device brand may have access to audience identifying information, a device brand that does not have access to the audience identifying information may be classified without having to share the audience identifying information across devices so that content may be customized for the audience using the device brand without the audience identifying information. The audience segmentation data for an unknown audience may be partial. For example, an unknown audience may be an audience for which a device has access to age or gender data, but not both age and gender data. The audience segmentation data may be provided by another system (e.g., a third-party system) and/or by users directly, with user consent and in accordance with relevant laws.

In one or more embodiments, the system may determine a level of confidence (e.g., likelihood) for which the system is willing to accept that an unidentified audience falls within an audience segment (e.g., a demographic segment, a behavioral segment, or a lifestyle segment) classifying an identified audience. For example, an identified audience primarily may be classified as men in their 40s (e.g., age), but neither the entire identified audience nor the entire unidentified audience may be within that audience segment. Therefore, the system may determine how large of an unidentified audience is needed to classify the audience, on the aggregate, based on the primary segment of the identified audience.

In one or more embodiments, the system may evaluate an unidentified audience using a combination of actions and observations (e.g., observable features). For example, an action may include viewing particular content (e.g., watching a particular video title, advertisement, etc.). An observation may include a day part (e.g., time of day) when the action occurred, the type/brand of device with which the action occurred, the location of the device used to perform the action at the time of performance, and the like.

In one or more embodiments, the system may have access to persistent identifiers for audiences because of user activities when signed into a particular application on a device brand. For example, when signed into a user account for an application, the user may view content, purchase content, download content, provide indications of preferred content and products, enter product reviews, and the like. From this information, the system may determine the audience segments of an audience that views a particular video title during a day part. In addition, the system may have information indicating that users of a particular device brand and/or in a particular location (e.g., city, zip code, etc.) may predominantly be within a particular demographic because the users of the device brand may access an application using the device brand, and the system may have access to the users' audience segmentation data for the application because the application is associated with the system (e.g., is under a same brand). When an audience of another application not under the same brand as the system, or for which users have not agreed to provide audience segmentation data to the system, does not provide access to such audience segmentation information, the system may provide aggregate audience segmentation data to the other application without sharing persistent identifiers and without identifying any particular user of the audience. This is because the system may determine with a level of confidence that the audience of the other application is similar to an audience of an application under the same brand as the system and for which the system has audience segmentation data (e.g., the audience similarity being determined by the actions and observations, such as which content an audience views at a particular time, using a particular device type/brand, etc.). In this manner, the system may not have persistent data for the other application's audience, but may have persistent data for its own application's audience, and may determine whether the persistent data for its own application's audience is likely to apply to the other application's audience based on the actions and observations.

In one or more embodiments, the system may define a set of attributes that define an event (e.g., a download, a streaming content event, etc.). In the case of unrecognized audiences, for context, the system may consider the attributes which it has access to, such as a video title being watched, the genre of the video title being watched, the type/brand of device used for the streaming, and the time of day. The system may estimate which streaming contexts have a high likelihood that a user belongs to a target audience segmentation group (e.g., viewers watching a program may have a higher likelihood of being of age 25-54). The system may use the likelihoods to classify aggregate audiences by their most relevant audience segments. The system may leverage its identified user audience segmentation data using its application(s) (e.g., applications under a common brand) to infer the probability of a program (or other content) being relevant for a particular audience segment by using Bayes Theorem. Consider a user watching a movie/program m using device d at time t. The system may determine the posterior $P_r(g|m, d, t)$ using Equation (1) below:

$$P_r(g \mid m, d, t) = \frac{P_r(g, m, d, t)}{P_r(m, d, t)} = \qquad (1)$$

-continued $$\frac{P_r(m \mid g, d, t) * P_r(g, d, t)}{P_r(m, d, t)} \propto P_r(m \mid g, d, t) * P_r(g, d, t) =$$

$$P_r(m \mid g, d, t) * P_r(t \mid g, d) * P_r(d) \propto$$

$$P_r(m \mid g, d, t) * P_r(t \mid g, d) * P_r(g \mid d)$$

where: $P_r$ (m|g, d, t) is the probability of watching movie/show m for a customer in an audience group g using device d at time t, $P_r$ (t|g, d) is the probability of watching some movie/program m at time t conditional on group g using device d, and $P_r$(g|d) is the probability of belonging to group g conditional on using device d. However, the system may not obtain $P_r$(m|g, d, t) and $P_r$(t|g, d) directly, so the system may assume that $P_r$(m|g, d, t)=$P_r$ (m|g, d2, t) and that $P_r$ (t|g, d)=$P_r$ (t|g, d2), where d2 may represent a device under a same brand as the system and to which the system has persistent data with which to identify aggregate audience segmentation data. The assumptions mean that conditional on audience segmentation data and time, audience users' preference across video titles may not be systematically different whether they use device d or device d2. Under these assumptions, the posterior may be represented by Equation (2) below:

$$P_r(g|m,d,t) \propto P_r(m|g,d2,t)*P_r(t|g,d2)*P_r(g|d) \qquad (2).$$

In one or more embodiments, the system may determine the probability that a user belongs to an audience group g (e.g., age and gender) given that the user is watching a video program (or consuming other content) of genre ge, using a device d, during a time of day t. When d2 represents a device under a same brand as the system and to which the system has persistent audience segmentation data, the probability may be represented by Equation (3) below:

$$P_r(g|ge,d,t) \propto P_r(ge|g,d2,t)*P_r(t|g,d2)*P_r(g|d) \qquad (3).$$

In one or more embodiments, the system may determine $P_r$(ge|g, d2, t) of Equation (3) above by using recognized user data from the application under another brand or for which audience segmentation data is not provided. For example, the system may have access to video titles from a content catalog used by an application. Any content (e.g., video title, etc.) may have a Boolean that defines whether the content belongs to a genre (e.g., action, horror, etc.). A video title, for example, may belong to multiple genres, so the system may define a genre of a context to be a string that concatenates all genres of the video title (e.g., "action|horror" is distinct from "action" or "action|romance"). User streaming data (e.g., what content is streamed, when, how often, etc.) may be available to the system, and user identifiers may be encrypted for protection. The time of day may be divided into multiple buckets (e.g., day parts), such as 3 AM-7 AM, 8 AM-12 PM, 1 PM-5 PM, 6 PM-9 PM, and 10 PM-2 AM, or other day parts. Demographic groups may include adults ages 18-64, adults ages 18-49, adults ages 21-34, adults ages 25-54, adults ages 35-64, adults ages 55-64, females ages 18-34, females ages 18-49, females ages 25-49, males ages 18-49, males ages 25-54, males ages 18-34, and/or other demographic groups. The system may use the above data to generate $P_r$(t|g, d2) for Equation (3) above, and may generate $P_r$(g|d) of Equation (3) using data from an application under the same brand. Accordingly, the system may generate $P_r$(g|ge, d, t) of Equation (3) for various demographic groups, and may normalize the product in Equation (3) to that its sum across audience segmentation groups becomes one. In this manner, the system may determine multiple probabilities that a user belongs to respective audience segmentation groups.

In one or more embodiments, the system may generate content identifiers to allow downstream systems to understand what a context is and then attach the correct audience segments (e.g., demographic segments, behavioral segments, lifestyle segments) to a context, the system may vend a map between attributes defining a context and a content identifier. For example, the content identifier may be a string with characters indicating an application used by the audience, and an additional string (e.g., "app123456"). The content identifiers may be unique for any genre, device brand/category, and time bucket combination. The content identifiers may persist over time, allowing new distinct combinations to be added using new content identifiers upon system refreshes, but without altering previously saved mappings. The system may map content identifiers to a set of relevant segments. For example, the system may receive a request with a content identifier, and may determine which audience segments are the most representative for the content (e.g., given a video program, the system may determine the most likely audience segments applicable to the audience of the video program). One content identifier may map to multiple segments, so the system may match content identifiers using rules, such as "always choose" a particular segment, "choose if probability of context is above a threshold of all contexts," "choose this segment if another segment was chosen," and the like. In this manner, thresholds may be used by the system to determine when to choose a demographic segment to apply to a video title when the probability of the audience of a video title being within the demographic segment exceeds a threshold. A context identifier may include the unique content identifiers and their mapping to one or more audience segments.

In one or more embodiments, the system may infer a probability that an unidentified application user belongs to a given audience segment by using Equation (4) below:

$$P_r(ui=d|j \in s \cap Cj) = P_r(j \in s \cap Cj)*(P_r(j \in s \cap Cj)|ui=d)*P_r \\ (ui=d) = j \in s\Pi P_r(Cj)*P_r(Cj|ui=d)*P_r(ui=d) \qquad (4)$$

where $P_r$(Cj) represents the probability that an application user is seen in context Cj, $P_r$(Cj|ui=d) represents the probability that the application user is seen in context Cj given that the user belongs to audience group d, and $P_r$(ui=d) represents the probability that any user of the application belongs to the audience group d.

In one or more embodiments, a context may be defined by attributes such as the content streamed (e.g., video title, audio title, game title, etc.), a local hour of the day when streamed (e.g., divided into time buckets with different day parts), and the device used for the stream (e.g., a desktop, a mobile device, living room device, etc.). To generate $P_r$(Cj) of Equation (4), the system may build a dataset, such as an account identifier, name of content streamed, genre of the content, local time of the stream, device with which the stream occurred, etc. A row of the dataset may represent a stream from one user. The data may include all users that have seen a stream in the category (e.g., video, audio, gaming, etc.).

In one or more embodiments, to identify audience segmentation data (e.g., age and gender, behavioral data, or lifestyle data) of application users, the system may map an account of one application to an account of another application, so the dataset may include the first application's account identifier and the second application's account identifier, and may include a subset of the users of the viewership dataset for which the system may match the first application's account identifier to the second application's account identifier. The system may join a viewership dataset with an accounts mapping dataset to generate a dataset that includes an account identifier, name of the content, device, and time of day bucket. Using available audience segmentation data, the system may generate a dataset that includes the account identifier, name of the content, device, time of day bucket, gender, age, and/or other audience segmentation data. From this dataset, the system may generate $P_r(Cj)$ of Equation (4) by counting the number of content views per distinct combinations of context (e.g., content, device, time bucket, number of views), then dividing the number of views of the context by a total number of views. The system may generate $P_r(ui=d)$ of Equation (4) for each age and gender bucket (e.g., the probability that an application user is female, male, age 18-22, age 23-27, . . . , age 95-99). To determine the probability of each bucket, the system may count the number of streams in a bucket and divide the number by the total number of streams. To generate $P_r(Cj|ui=d)$ of Equation (4), the system may use the same bucket representations as when generating $P_r(ui=d)$, counting the number of streams for each audience bucket and dividing by the total number of streams in the respective audience bucket. Then the system may generate $P_r(ui=d|j \in s \cap Cj)$ of Equation (4). The output of the system may be a file that maps a set of application accounts to a set of audience segments used by the system to select and customize content. The audience segments may overlap, so one user may belong to many segments. For any application user, the system may determine the probability that the user belongs to one of the audience segments using Equation (4), and may map the user to an audience segment when the probability is greater than a threshold value.

In one or more embodiments, the Equations above represent examples that are not meant to be limiting. The present disclosure provides for a determination of the audience segmentation data of an unrecognized request (e.g., a request for audience segmentation information for an unidentified group of users). Because the audience segmentation information of the unidentified group may not be available, the system may analyze contextual variables, and identify the audience segmentation data of users of an application for which the system has audience segmentation data, and where the identified users watch, listen to, read, etc. the same content as the unidentified group at a same time and using a same device type/brand as the unidentified group. The system may determine the probability that users are in an audience segment based on other data, such as during a session, or longer. Then, the system may adjust the probability based on the device population as a whole. For example, knowing that users of a device type/brand skew younger in age, and a determined probability that a user is in an older age demographic, the system may analyze the intersection between the older and younger age demographics. The result may be a probability, and the system may evaluate whether the probability is high enough (e.g., exceeds a threshold) to classify users as being within an audience segment. Based on the audience segment of any audience as determined by the system, the system or other systems may select and customize content based on the likely audience segment of any audience.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for audience matching and content selection for unidentified audiences, in accordance with one or more example embodiments of the present disclosure.

Referring to FIG. 1, the system 100 may include an audience 102 of one or more users of an application (e.g., Application 1) and devices 104 having a first device type (e.g., brand). The devices 104 may present content (e.g., video content, audio content, gaming content, etc.) to the users of the audience 102 via the application. The content presented by the devices 104 also may include advertisements, recommendations, user interfaces, and the like, that may be customized based on audience segmentation data of the audience 102. The system 100 may include an audience 120 of one or more users of an application (e.g., Application 2) and devices 122 having a second device type (e.g., brand). The devices 122 may present content (e.g., video content, audio content, gaming content, etc.) to the users of the audience 120 via the application. The content presented by the devices 122 also may include advertisements, recommendations, user interfaces, and the like, that may be customized based on audience segmentation data of the audience 120.

Still referring to FIG. 1, a remote system 150 may receive requests to select content for the devices 104 to present to the audience 102 and for the devices 122 to present to the audience 120 based on audience segmentation data of the respective audiences. The remote system 150 may have access to audience segmentation data 152 for audiences of Application 2 (e.g., the audience 120), but may not have access to audience segmentation data for audiences of Application 1. For example, the remote system 150 may have the same device type (e.g., brand) as the devices 122 (and/or of the Application 2), but may have a different device type than the devices 104 (and/or of the Application 1), and the devices 104 (and/or the Application 1) may not be permitted to share information (e.g., persistent identifiers for the audience 102) with the remote system 150 that would otherwise allow the remote system 150 to identify audience segmentation data for the audience 102. However, because the remote system 150 may have access to the audience segmentation data 152 for audiences of Application 2 (e.g., because users of the Application 2 or the devices 122 may opt into sharing demographic data with the remote system 150, which may be of the same device type as the devices 122), the remote system 150 may be able to infer audience segmentation data for the audience 102 based on the content presented to the audience 102 at a given time, using the first device type. The audience segmentation data 152 may be anonymized over a group of users (e.g., the users of the audience 120) so that no individual user's data may be identified.

Still referring to FIG. 1, the remote system 150 may leverage the audience segmentation data 152 for a known audience (e.g., the audience 120) to infer demographic data about an unknown audience (e.g., the audience 102). At block 162, the remote system 150 may receive a request for content to present to an audience of Application 1 (e.g., the audience 102, using the devices 104). Using the Equations above, the remote system 150 may, at block 164 determine that the audience of Application 1 (e.g., the audience 102) is in a same audience group of an audience (e.g., the audience 120) of Application 2. At block 166, the remote system 150 may cause a selection of content to present to the audience 102 based on the audience group that includes the audience 120.

In one or more embodiments, with reference to block 164, the remote system 150 may evaluate an unidentified audience (e.g., the audience 102) using a combination of actions and observations (e.g., observable features). For example, an action may include viewing particular content (e.g., watching a particular video title, advertisement, etc.). An observation may include a day part (e.g., time of day) when the action occurred, the type/brand of device with which the action occurred (e.g., the type of the devices 104), the location of the device used to perform the action at the time of performance, and the like.

In one or more embodiments, the remote system 150 may have access to persistent identifiers for the audience 120 because of user activities when signed into Application 2 on the devices 122. For example, when signed into a user account for Application 2, users of the audience 120 may view content, purchase content, download content, provide indications of preferred contents and products, enter product reviews, and the like. From this information, the remote system 150 may determine the demographics of the audience 120 that views a particular video title during a day part. In addition, the remote system 150 may have information indicating that users of a particular device brand and/or in a particular location (e.g., city, zip code, etc.) may predominantly be within a particular audience segment (group) because the users of the device brand may access Application 2 using the device brand, and the remote system 150 may have access to the users' audience segmentation data for Application 2 because Application 2 is associated with the remote system 150 (e.g., is under a same brand). When an audience of another application not under the same brand as the remote system 150, such as Application 1, does not provide access to such demographic information, the remote system 150 may provide aggregate audience data to Application 2 without sharing persistent identifiers and without identifying any particular user of the audience 102. This is because the remote system 150 may determine with a level of confidence that the audience 102 is similar to the audience 120 for which the remote system 150 has the demographic data 152 (e.g., the audience similarity being determined by the actions and observations, such as which content an audience views at a particular time, using a particular device type/brand, etc.). In this manner, the remote system 150 may not have persistent data for the audience 102 (at least not all audience segmentation data), but may have persistent data for the audience 120, and may determine whether the persistent data for the audience 120 is likely to apply to the audience 102 based on the actions and observations.

In one or more embodiments, the remote system 150 may define a set of attributes that define an event (e.g., a download, a streaming content event, etc.). In the case of unrecognized audiences, for context, the remote system 150 may consider the attributes which it has access to, such as a video title being watched, the genre of the video title being watched, the type/brand of device used for the streaming, and the time of day. The remote system 150 may estimate which streaming contexts have a high likelihood that a user belongs to a target audience group (e.g., viewers watching a program may have a higher likelihood of being of age 25-54). The remote system 150 may use the likelihoods to classify aggregate audiences by their most relevant audience segments. The remote system 150 may leverage its identified user audience segmentation data using its application(s) (e.g., Application 2) to infer the probability of a program (or other content) being relevant for a particular audience group. The remote system 150 may determine the posterior $P_r(g|m, d, t)$ using Equation (1) above. However, the system may not obtain $P_r(m|g, d, t)$ and $P_r(t|g, d)$ directly, so the system may assume that $P_r(m|g, d, t) = P_r(m|g, d2, t)$ and that $P_r(t|g, d) = P_r(t|g, d2)$, where d2 may represent a device under a same brand as the remote system 150 and to which the remote system 150 has the audience segmentation data 152 with which to identify aggregate audience segments. The assumptions mean that conditional on audience segmentation data and time, audience users' preference across video titles may not be systematically different whether they use device d or device d2. Under these assumptions, the posterior may be represented by Equation (2) above.

In one or more embodiments, the remote system 150 may determine the probability that a user belongs to an audience group g (e.g., age and gender) given that the user is watching a video program (or consuming other content) of genre ge, using a device d, during a time of day t. When d2 represents a device under a same brand as the system and to which the system has persistent audience data, the probability may be represented by Equation (3) above.

In one or more embodiments, the remote system 150 may determine $P_r(ge|g, d2, t)$ of Equation (3) above by using recognized user data from the application under another brand. For example, the remote system 150 may have access to video titles from a content catalog used by an application. Any content (e.g., video title, etc.) may have a Boolean that defines whether the content belongs to a genre (e.g., action, horror, etc.). A video title, for example, may belong to multiple genres, so the remote system 150 may define a genre of a context to be a string that concatenates all genres of the video title (e.g., "action|horror" is distinct from "action" or "action|romance"). User streaming data (e.g., what content is streamed, when, how often, etc.) may be available to the remote system 150, and user identifiers may be encrypted for protection. The time of day may be divided into multiple buckets (e.g., day parts), such as 3 AM-7 AM, 8 AM-12 PM, 1 PM-5 PM, 6 PM-9 PM, and 10 PM-2 AM, or other day parts. Demographic groups may include adults ages 18-64, adults ages 18-49, adults ages 21-34, adults ages 25-54, adults ages 35-64, adults ages 55-64, females ages 18-34, females ages 18-49, females ages 25-49, males ages 18-49, males ages 25-54, males ages 18-34, and/or other demographic groups. The remote system 150 may use the above data to generate $P_r(t|g, d2)$ for Equation (3) above, and may generate $P_r(g|d)$ of Equation (3) using data from an application under the same brand. Accordingly, the remote system 150 may generate $P_r(g|ge, d, t)$ of Equation (3) for various audience groups, and may normalize the product in Equation (3) so that its sum across audience groups becomes one. In this manner, the remote system 150 may determine multiple probabilities that a user belongs to respective audience groups.

In one or more embodiments, the remote system 150 may generate content identifiers and may vend a map between attributes defining a context and a content identifier. For example, the content identifier may be a string with characters indicating an application used by the audience, and an additional string (e.g., "app123456"). The content identifiers may be unique for any genre, device brand/category, and time bucket combination. The content identifiers may persist over time, allowing new distinct combinations to be added using new content identifiers upon system refreshes, but without altering previously saved mappings. The remote system 150 may map content identifiers to a set of relevant segments. For example, the remote system 150 may receive a request with a content identifier, and may determine which audience segments are the most representative for the content (e.g., given a video program, the system may determine the most likely audience segments applicable to the audience of the video program). One content identifier may map to multiple segments, so the remote system 150 may match content identifiers using rules, such as "always choose" a particular segment, "choose if probability of context is above a threshold of all contexts," "choose this segment if another segment was chosen," and the like. In this manner, thresholds may be used by the remote system 150 to determine when to choose a demographic segment to apply to a video title when the probability of the audience 102 of a video title being within the audience segment exceeds a threshold.

In one or more embodiments, the remote system 150 may infer a probability that an unidentified application user (e.g., a user of the audience 102 of Application 1) belongs to a given audience segment of the audience segmentation data 152 by using Equation (4) above.

In one or more embodiments, to identify audience segmentation data of application users, the remote system 150 may map an account of one application to an account of another application, so the dataset may include the first application's account identifier and the second application's account identifier, and may include a subset of the users of the viewership dataset for which the remote system 150 may match the first application's account identifier to the second application's account identifier. The remote system 150 may join a viewership dataset with an accounts mapping dataset to generate a dataset that includes an account identifier, name of the content, device, and time of day bucket. Using available audience data, the system may generate a dataset that includes the account identifier, name of the content, device, time of day bucket, gender, and age. From this dataset, the remote system 150 may generate $P_r$ (Cj) of Equation (4) by counting the number of content views per distinct combinations of context (e.g., content, device, time bucket, number of views), then dividing the number of views of the context by a total number of views. The remote system 150 may generate $P_r$ (ui=d) of Equation (4) for each age and gender bucket (e.g., the probability that an application user is female, male, age 18-22, age 23-27, . . . , age 95-99). To determine the probability of each bucket, the remote system 150 may count the number of streams in a bucket and divide the number by the total number of streams. To generate $P_r$ (Cj|ui=d) of Equation (4), the remote system 150 may use the same bucket representations as when generating $P_r$ (ui=d), counting the number of streams for each audience bucket and dividing by the total number of streams in the respective audience bucket. Then the remote system 150 may generate $P_r$ (ui=d|j∈S∩Cj) of Equation (4). The output of the remote system 150 may be a file that maps a set of application accounts to a set of audience segments used by the remote system 150 to select and customize content. The audience segments may overlap, so one user may belong to many segments. For any application user, the remote system 150 may determine the probability that the user belongs to one of the audience segments using Equation (4), and may map the user to an audience segment when the probability is greater than a threshold value.

The devices 104 and the devices 122 may include any suitable processor-driven device including, but not limited to, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2A illustrates an example content presentation 200 for unidentified audiences, in accordance with one or more example embodiments of the present disclosure.

Referring to FIG. 2A, at a first time, a device 204 (e.g., similar to the devices 104 and the devices 122 of FIG. 1) may present first content 202, which may include video content (e.g., movies, television programs, game content, etc.). At some later time, the device 204 may present other content 210, such as an advertisement, user interface (e.g., with content recommendations, playlists, etc.), or the like, which can be presented during presentation of the video or audio content, or can be presented during a break in the video or audio content. The other content 210 presented may be customized based on audience segmentation data of a viewer (e.g., users of the audience 102 of FIG. 1). However, when audience segmentation data of the viewer is unknown (e.g., the remote system 150 of FIG. 1 not having audience segmentation data for the audience 102), the other content 210 may be selected based on a determination of whether the viewer is likely to belong to an audience segment used to categorize viewers of another audience (e.g., the audience 120 of FIG. 1 for which the remote system 150 has audience segmentation data).

FIG. 2B illustrates an example content presentation 250 for unidentified audiences, in accordance with one or more example embodiments of the present disclosure.

Referring to FIG. 2B, at a first time, a device 252 (e.g., similar to the devices 104 and the devices 122 of FIG. 1) may present first content 260 (e.g., audio content such as music, audiobooks, podcasts). At some later time, the device 252 may present other content 270, such as an advertisement, which can be presented during presentation of the video or audio content, or can be presented during a break in the audio content. The other content 270 presented may be customized based on audience segmentation data of a viewer (e.g., users of the audience 102 of FIG. 1). However, when audience segmentation data of the viewer is unknown (e.g., the remote system 150 of FIG. 1 not having audience segmentation data for the audience 102), the other content 270 may be selected based on a determination of whether the viewer is likely to belong to an audience segmentation segment used to categorize viewers of another audience (e.g., the audience 120 of FIG. 1 for which the remote system 150 has audience segmentation data).

Figure 3:
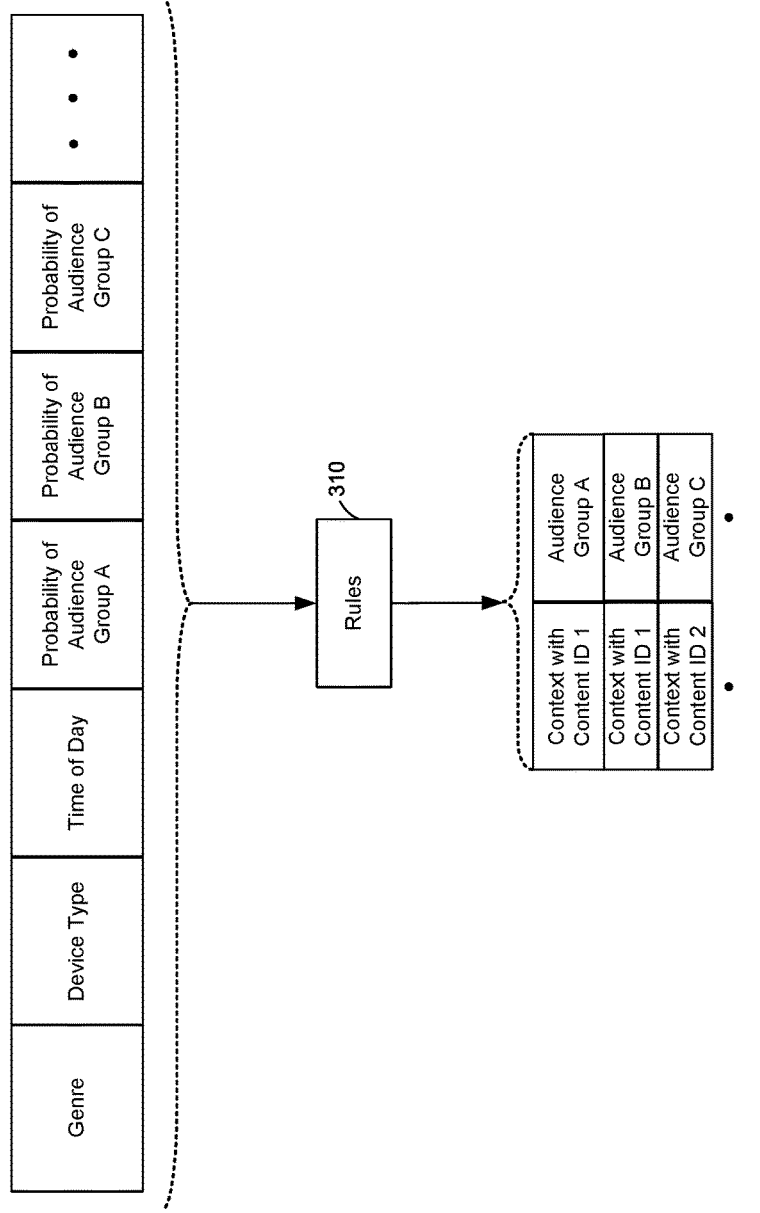
FIG. 3 illustrates an example mapping of content identifiers to audience group identifiers, in accordance with one or more example embodiments of the present disclosure.

FIG. 3 illustrates an example mapping 300 of content identifiers to audience group identifiers, in accordance with one or more example embodiments of the present disclosure.

Referring to FIG. 3, a user 302 (e.g., of the audience 102 of FIG. 1) may consume content (e.g., using the devices 104 of FIG. 1) that may be categorized (e.g., by the remote system 150 of FIG. 1) based on the genre of the content (e.g., comedy, action, horror, drama, game, etc.), the device type, the time of day, and respective probabilities that the user 302 belongs to a particular audience group (e.g., audience Group A, audience Group B, audience Group C, etc.). In this manner, the user 302 may be evaluated using the Equations above to determine the likelihood (e.g., probability) that the user 302 belongs in a particular demographic group, and the analysis may be used to evaluate the possibility of the user 302 belonging to multiple demographic groups. The audience group analysis, as described with respect to FIG. 1 using the Equations above, may consider the genre of the content consumed by the user 302, device type used to present the content to the user 302, and time of day when the content of the genre is presented to the user 302 to infer whether the user 302 belongs to various audience groups based on whether the audience groups also include audience users who use the same device type to watch content of the same genre during the same type of day.

Still referring to FIG. 3, a set of rules 310 may govern the selection of one or more audience groups to represent the user 302 (e.g., and the audience in which user 302 is included) based on the likelihood that the user 302 belongs to one or more of the audience groups. When a probability that the user 302 is part of an audience group (e.g., as determined using the Equations above) exceeds a probability threshold, the rules 310 may require that a particular audience group always be selected, that a particular audience group be selected when its probability is above a threshold percentile of all audience group probabilities, that a particular audience group be selected based on the probability exceeding a threshold set as a result of another audience group being selected, and the like.

Still referring to FIG. 3, the rules 310 may be used to generate the mapping 300, including audience segments selected based on the rules 310. For example, the content identifier may be a string with characters indicating an application used by the audience, and an additional string (e.g., "app123456"). The content identifiers (e.g., Content ID 1, Content ID 2, etc.) may be unique for any genre, device brand/category, and time bucket combination. The content identifiers may persist over time, allowing new distinct combinations to be added using new content identifiers upon system refreshes, but without altering previously saved mappings. The mapping 300 may map context, including the content identifiers, to a set of relevant audience segments. For example, the remote system 150 of FIG. 1 may receive a request with a content identifier, and may determine which audience segments are the most representative for the content (e.g., given a video program, the system may determine the most likely audience segments applicable to the audience of the video program). One content identifier may map to multiple segments, so the system may match content identifiers using rules, such as "always choose" a particular segment, "choose if probability of context is above a threshold of all contexts," "choose this segment if another segment was chosen," and the like. In this manner, thresholds may be used to determine when to choose an audience segment to apply to a video title when the probability of the audience of a video title being within the audience segment exceeds a threshold.

Figure 4A:
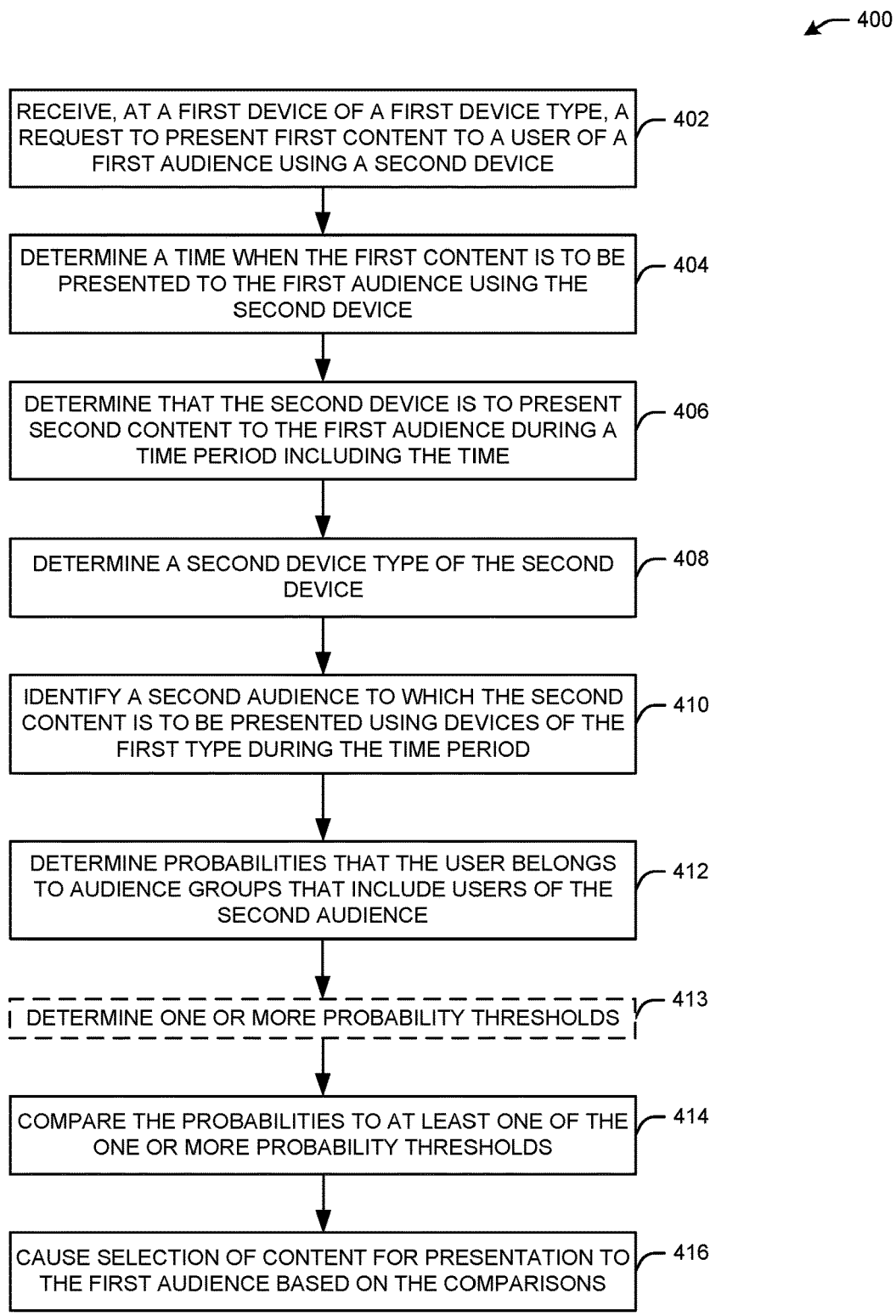
FIG. 4A illustrates a flow diagram for a process for audience matching and content selection for unidentified audiences, in accordance with one or more example embodiments of the present disclosure.

FIG. 4A illustrates a flow diagram for a process 400 for audience matching and content selection for unidentified audiences, in accordance with one or more example embodiments of the present disclosure.

At block 402, a system (or device, e.g., the remote system 150 of FIG. 1) may receive a request to present first content (e.g., the other content 210 of FIG. 2A, the other content 270 of FIG. 2B) to a user (e.g., the user 302 of FIG. 3) of a first audience (e.g., the audience 102 of FIG. 1) using a second device (e.g., the devices 104 of FIG. 1). The first audience and any user of the first audience may be users for which the system does not have audience segmentation data. In this manner, to customize the first content, the system may need to infer audience data for the user of the first audience based on one or more audiences (e.g., the audience 120 of FIG. 1) for which the system has access to audience segmentation data (e.g., the audience segmentation data 152 of FIG. 1).

At block 404, the system may determine a time when the first content is to be presented to the first audience using the second device. Based on the time, the system may determine content presented to another audience for which the system has audience segmentation data, allowing the system to determine a likelihood that the first audience would be included in a demographic segment represented by the demographic data.

At block 406, the system may determine that the second device is to present second content to the first audience during a time period that includes the time at which the first content is to be presented to the first audience using the second device. For example, the system may identify audiences for which the system has audience segmentation data and which are presented the second content during the time period. Based on the time period, the system may determine which content is likely to be presented to users of the second device (e.g., users of a second device type).

At block 408, the system may determine a second device type of the second device (e.g., the devices 122 of FIG. 1). Using context such as the type/genre of content presented to audiences using a device type at a particular time, the system may infer the likelihood that the first audience using the second device type, for which the system has no audience segmentation data, may be within an audience segment (e.g., demographic, behavioral, lifestyle) represented by audience segmentation data of the audiences of the first device type for which the system has audience segmentation data.

At block 410, the system may identify a second audience to which the second content is to be presented using devices of the first type during the time period. Because the system may have audience segmentation data for audiences of the first device type, such as the second audience, the system may determine which audiences, such as the second audience, may be presented content of the same genre as the first audience using the second device type during the time period (e.g., based on what content is known to be presented to users of the second device type at a particular time and what content is known to be presented to users of the first device type at a particular time). In particular, the system may identify audience segments that include users of the second audience.

At block 412, the system may use the demographic segments that include users of the second audience to evaluate (e.g., using the Equations above) the likelihood that the user of the first audience would belong to an audience group that includes users of the second audience. The user of the first audience may belong to multiple audience segments representative of the second audience, so the system may evaluate the respective audience segments to determine one or more segments to select as a representative of the user. In particular, the system may determine probabilities that the user belongs to one or more audience groups that include users of the second audience.

At block 413, optionally, the system may determine one or more probability thresholds to use when determining whether the user belongs to an audience group. Using statistical rules, the system may determine what the thresholds are that should be compared to the respective probabilities that the user belongs to an audience group.

At block 414, the system may compare the probabilities that the user belongs to one or more audience groups that include users of the second audience to a probability threshold, and may select representative audience groups (e.g., segments) based on the comparisons and a set of rules (e.g., the rules 310 of FIG. 3).

At block 416, the system may cause a selection of content for presentation to the first audience based on the comparisons (e.g., the first content or some other content determined relevant to the selected one or more audience groups).

Referring to blocks 414 and 416, the system may generate content identifiers to allow downstream systems to understand what a context is and then attach the correct audience segments to a context, the system may vend a map between attributes defining a context and a content identifier. For example, the content identifier may be a string with characters indicating an application used by the audience, and an additional string (e.g., "app123456"). The content identifiers may be unique for any genre, device brand/category, and time bucket combination. The content identifiers may persist over time, allowing new distinct combinations to be added using new content identifiers upon system refreshes, but without altering previously saved mappings. The system may map content identifiers to a set of relevant segments. For example, the system may receive a request with a content identifier, and may determine which audience segments are the most representative for the content (e.g., given a video program, the system may determine the most likely audience segments applicable to the audience of the video program). One content identifier may map to multiple segments, so the system may match content identifiers using rules, such as "always choose" a particular segment, "choose if probability of context is above a threshold of all contexts," "choose this segment if another segment was chosen," and the like. In this manner, thresholds may be used by the system to determine when to choose an audience segment to apply to a video title when the probability of the audience of a video title being within the audience segment exceeds a threshold.

Referring to block 412, the system may determine the probability of the user belonging to an audience group (age+gender) given that they are watching a movie/show of genre, using a type of device, and at time of day. The system may determine $P_r(g|ge, d2, t)$ of Equation (3) above using recognized user data of Application 2 of FIG. 1, for example, because any content may have a Boolean that defines whether the content belongs to a genre (or multiple genres—the genre may be a string that concatenates all genres of the content). Using the same data, the system may determine $P_r(t|g, d2)$ of Equation (3), and may use the audience segmentation data 152 of FIG. 1 to represent $P_r(g|d)$ of Equation (3). Accordingly, the system may determine $P_r(g|ge, d, t)$ of Equation (3), and may normalize the product of Equation (3) across multiple audience groups so that the sum of the probabilities sums to one.

Alternatively, still referring to block 412, the system may define a user's context using attributes such as the content presented, the time at which the content is presented, and the device type used to present the content. The system may generate a dataset to generate $P_r(Cj)$ of Equation (4), such as a dataset of [account identifier, name of content, genre of content, time of content presentation, device type used to present the content]. Any row of the dataset may include any users that have been presented the content of a particular category. To obtain audience segmentation data, the system may map an account of users of one application to users of another application, and the system may input a list of account identifiers to generate the audience segmentation data 152 without the customer identifier (e.g., to prevent two-way matching). The system may count the number of views per distinct combinations of context: [games or other content, device, time bucket, number of views], then divide number of views of the context by the total number of views. The system may determine $P_r(ui=d)$ of Equation (4) for any bucket in two dimensions: age and gender (e.g., the probability that a user is of a particular gender and within an age range) or another audience segment with multiple dimensions. The system may determine how many content presentation streams fall within a bucket, and divide that number of streams by the total number of streams. Using the same bucket representations, the system may determine $P_r(Cj|ui=d)$ of Equation (4). For each distinct audience group, the system may count the number of streams that belong to a given context, and then divide that number by the total number of streams that apply to the audience group. For each distinct application user, the system may determine $Pr(ui=d|j \in s \cap Cj)$ of Equation (4). The system may generate a file as an output, the file mapping an account of Application 1 to a set of audience groups used to group users of the Application 2.

Figure 4B:
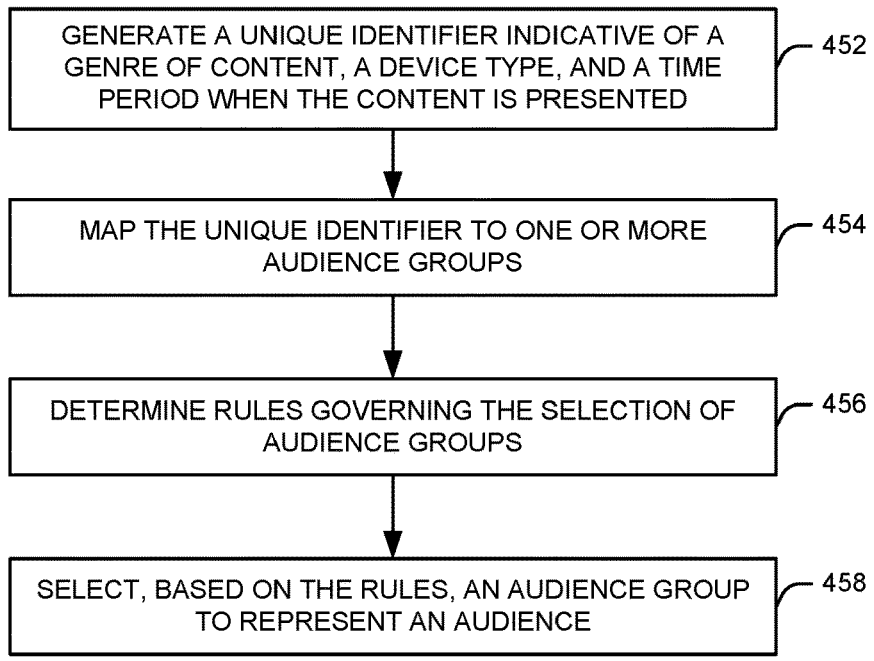
FIG. 4B illustrates a flow diagram for a process for audience matching and content selection for unidentified audiences, in accordance with one or more example embodiments of the present disclosure.

FIG. 4B illustrates a flow diagram for a process 450 for audience matching and content selection for unidentified audiences, in accordance with one or more example embodiments of the present disclosure.

At block 452, a system (or device, e.g., the remote system 150 of FIG. 1) may generate a unique identifier (e.g., as shown in FIG. 3) indicative of a genre of content presented to a user, a device type, and a time period when the content is presented to the user. Referring to blocks 414 and 416 of FIG. 4A, for example, the system may generate content identifiers to allow downstream systems to understand what a context is and then attach the correct audience segments to a context, the system may vend a map between attributes defining a context and a content identifier. For example, the content identifier may be a string with characters indicating an application used by the audience, and an additional string (e.g., "app123456"). The content identifiers may be unique for any genre, device brand/category, and time bucket combination. The content identifiers may persist over time, allowing new distinct combinations to be added using new content identifiers upon system refreshes, but without altering previously saved mappings.

At block 454, the system may map the unique identifier to one or more audience groups. The system may map content identifiers to a set of relevant segments. For example, the system may receive a request with a content identifier, and may determine which audience segments are the most representative for the content (e.g., given a video program, the system may determine the most likely audience segments applicable to the audience of the video program).

At block 456, the system may determine rules (e.g., the rules 310 of FIG. 3) governing the selection of one or more audience groups to represent an audience. One content identifier may map to multiple segments, so the system may match content identifiers using rules, such as "always choose" a particular segment, "choose if probability of context is above a threshold of all contexts," "choose this segment if another segment was chosen," and the like. In this manner, thresholds may be used by the system to determine when to choose an audience segment to apply to a video title when the probability of the audience of a video title being within the audience segment exceeds a threshold. At block 458, the system may select, based on the rules, one or more audience groups to represent an audience. In this manner, the process 450 may represent blocks 414 and 416 of FIG. 4A.

Figure 5:
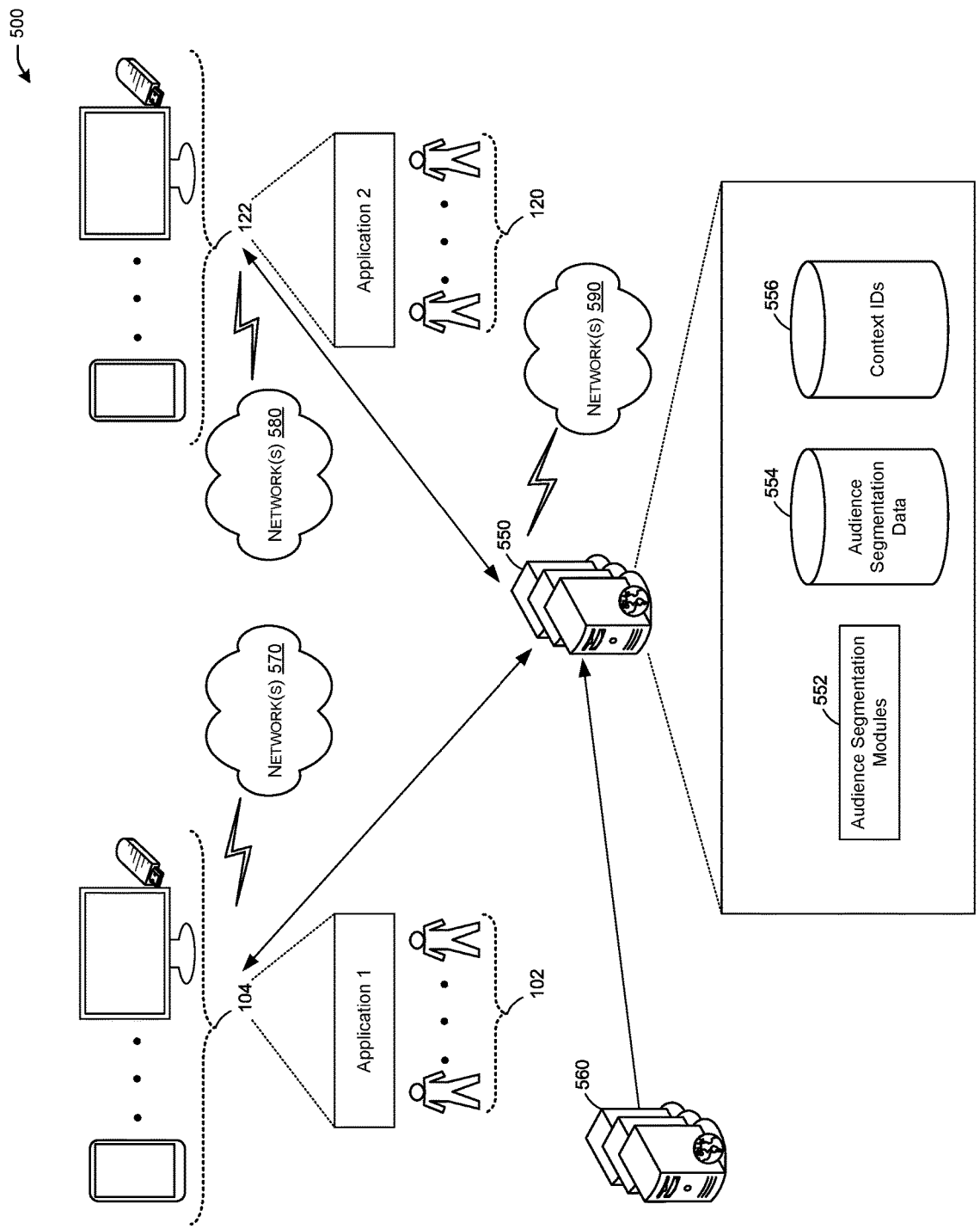
FIG. 5 illustrates an example system for audience matching and content selection for unidentified audiences, in accordance with one or more example embodiments of the present disclosure.

FIG. 5 illustrates an example system 500 for audience matching and content selection for unidentified audiences, in accordance with one or more example embodiments of the present disclosure.

Referring to FIG. 5, the system 500 may include the audience 102, the Application 1, the devices 104, the audience 120, Application 2, and the devices 122 of FIG. 1. A remote system 550 may represent a more detailed version of the remote system 150 of FIG. 1 in that the remote system 550, like the remote system 150, may perform the process 400 of FIG. 4A and the process 450 of FIG. 4B. In particular, the remote system 550 may include audience segmentation modules 552 to facilitate the process 400 of FIG. 4A and the process 450 of FIG. 4B using audience demographic data 554 (e.g., similar to the audience segmentation data 152 of FIG. 1) and context identifiers 556 (e.g., similar to those shown in FIG. 3, including content such as a content identifier). In this manner, the remote system 550 may receive requests to help present content to the audience 102, for which the remote system 550 may not have audience segmentation data among the audience demographic data 554, and may use the audience segmentation data 554 (e.g., representative of the audience 120) and the context identifiers 556 to determine whether users of the audience 102 would be within any audience groups that represent the audience 120 or other audiences to which the remote system 550 may have audience segmentation data in the audience segmentation data 554.

Still referring to FIG. 5, the remote system 550 may receive the audience segmentation data 554 from a separate system (e.g., system 560), which may be a third-party system that provides at least some of the audience segmentation data 554 (e.g., so that at least some of the audience segmentation data 554 is not provided to the remote system 550 directly by users of an audience). The audience segmentation data 554 may be anonymized over a group of users of an audience (e.g., so that a single user's data may not be isolated).

In one or more embodiments, the context identifiers 556 may be based on a session's worth of content (e.g., in contrast with a point-in-time view of what content a user is viewing). For example, a user may be presented more than one content (e.g., multiple video and/or audio titles, etc.) during a session. In this manner, the context used to evaluate the likelihood of a user belonging to an audience group may be based on multiple genres of content during one or more day parts.

Any of the devices 104, the devices 122, and/or the remote system 550 may be configured to communicate with each other via one or more communications networks 570, 580, and/or 590 wirelessly or wired. Any of the communications networks 570, 580 and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 570, 580, and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 570, 580, and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The examples presented herein are not intended to be limiting.

Figure 6:
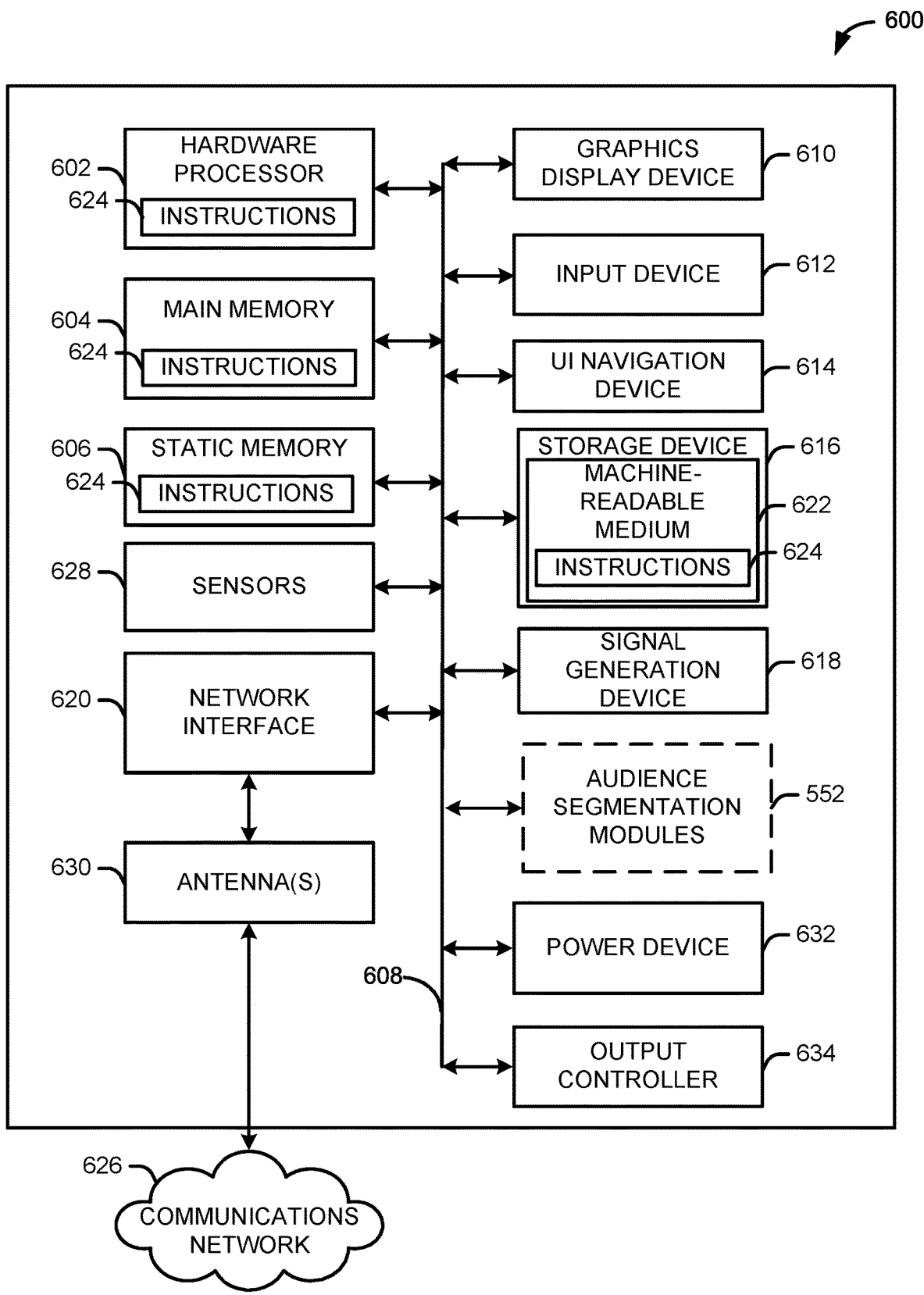
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the devices 104 of FIG. 1, the devices 122 of FIG. 1, the remote system 150 of FIG. 1, the remote system 550 of FIG. 5) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a tensor processing unit (TPU) having an artificial intelligence accelerator application-specific integrated circuit (ASIC), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker, emitters, etc.), the audience segmentation modules 552 of FIG. 5, a network interface device/transceiver 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in the claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, by at least one processor of a first device of a first device type, a request to present first content to a user of a first audience using a first application of a second device, wherein demographic data of audiences of the first application are inaccessible to the first device;
   determining, by the at least one processor, a time at which the first content is to be presented to the first audience using the second device;
   determining, by the at least one processor, that the second device is to present second content to the first audience during a time period that includes the time;
   determining, by the at least one processor, a second device type of the second device;
   identifying, by the at least one processor, a second audience to which the second content is to be presented using a second application and devices of the first device type during the time period, wherein demographic data of audiences of the second application are accessible to the first device;
   determining, by the at least one processor, a first probability that the user belongs to a first demographic group that includes users of the second audience based on the second content, the time period, and the second device type;
   determining, by the at least one processor, a second probability that the user belongs to a second demographic group that includes users of the second audience based on the second content, the time period, and the second device type;
   determining, by the at least one processor, that the first probability exceeds a probability threshold;
   determining, by the at least one processor, that the second probability fails to exceed the probability threshold; and
   causing selection, by the at least one processor, of the first content for presentation to the first audience based on the first probability exceeding the probability threshold.

2. The method of claim 1, further comprising:
   determining a third probability of the user belonging to the first demographic group conditional on the second content being presented using the second device type at the time,
   wherein the first probability is based on the third probability.

3. The method of claim 1, wherein the first device type is the same as the second device type, the method further comprising:
   determining a third probability of the second content being of a video genre conditional on the first demographic group using the first device type at the time,
   wherein the first probability is based on the third probability.

4. The method of claim 1, wherein a group of users of an application comprises the user, the method further comprising:

determining a third probability that the user is associated with a context conditional on the user belonging to the first demographic group; and
determining a fourth probability that the group of users belongs to the first demographic group,
wherein the first probability is based on the third probability and the fourth probability.

5. A method, comprising:
receiving, by at least one processor of a first device of a first device type, a request to present first content to a user of a first audience using a second device, wherein audience segmentation data for the first audience are inaccessible to the first device;
determining, by the at least one processor, a time at which the first content is to be presented to the first audience using the second device;
determining, by the at least one processor, that the second device is to present second content to the first audience during a time period that includes the time;
determining, by the at least one processor, a second device type of the second device;
identifying, by the at least one processor, a second audience to which the second content is to be presented using devices of the first device type during the time period, wherein audience segmentation data for the second audience are accessible to the first device;
determining, by the at least one processor, a probability that the user belongs to an audience group that includes users of the second audience based on the second content, the time period, and the second device type; and
causing selection, by the at least one processor, of the first content or third content for presentation to the first audience based on a comparison of the probability to a probability threshold.

6. The method of claim 5, wherein the first device type is different than the second device type, and wherein audience segmentation data for the second audience is inaccessible to the second device.

7. The method of claim 5, wherein the audience segmentation data comprises at least one of demographic data, behavioral data, or lifestyle data.

8. The method of claim 5, further comprising:
determining a second probability that the user is watching the second content conditional on the audience group using the second device type at the time,
wherein determining the probability is based on the second probability.

9. The method of claim 5, further comprising:
determining a second probability of the user belonging to the first audience group conditional on the second content being presented using the second device type at the time,
wherein the probability is based on the second probability.

10. The method of claim 5, wherein the first device type is the same as the second device type, the method further comprising:
determining a second probability of the second content being of a video genre conditional on the audience group using the first device type at the time,
wherein the probability is based on the second probability.

11. The method of claim 5, wherein a group of users of an application comprises the user, the method further comprising:
determining a second probability that the user is associated with a context conditional on the user belonging to the audience group; and
determining a third probability that the group of users belongs to the audience group,
wherein the probability is based on the second probability and the third probability.

12. The method of claim 11, wherein the second content is associated with a game, wherein the context comprises the game, an hour of day during which the game is streamed to the second audience, and the first device type.

13. The method of claim 5, further comprising:
determining a second probability that the user belongs to a second audience group that includes users of the second audience based on the second content, the time period, and the second device type;
determining that the probability exceeds the probability threshold; and
determining, by the at least one processor, that the second probability fails to exceed the probability threshold,
wherein the first content is selected based on the probability exceeding the probability threshold.

14. The method of claim 5, further comprising:
generating a unique identifier indicative of a genre of the second content, the second device type, and the time period,
wherein determining the probability is based on the unique identifier.

15. The method of claim 14, further comprising:
mapping the unique identifier to the audience group;
mapping the unique identifier to a second audience group; and
selecting, based on a rule, the audience group to represent the first audience.

16. The method of claim 5, wherein the first content is to be presented to the first audience using a first application, wherein the second content is to be presented to the second audience using a second application, wherein the first device has access to audience segmentation data for audiences using the second application, and wherein audience segmentation data for audiences using the first application are inaccessible to the first device.

17. A system, comprising:
a first device having demographic data for audiences of a first application; and
a second device having a first device type and the first application,
wherein the first device comprises memory coupled to at least one processor, the at least one processor configured to:
receive, from a third device, a request to present first content to a user of a first audience using the third device and a second application, wherein audience segmentation data for the audiences of the second application are inaccessible to the first device and the second device;
determine a time at which the first content is to be presented to the first audience using the third device;
determine that the third device is to present second content to the first audience during a time period that includes the time;
determine a second device type of the third device;
identify a second audience to which the second content is to be presented using devices of the first device type and the first application during the time period;
determine a probability that the user belongs to an audience group that includes users of the second audience based on the second content, the time period, and the second device type; and cause selection of the first content or third content for presentation to the first audience based on a comparison of the probability to a probability threshold.

18. The system of claim 17, wherein the at least one processor is further configured to:
  determine a second probability that the user is watching the second content at the time conditional on the audience group using the second device type,
  wherein to determine the probability is based on the second probability.

19. The system of claim 17, wherein the at least one processor is further configured to:
  determine a second probability of the user belonging to the audience group conditional on the second content being presented using the second device type at the time, wherein the probability is based on the second probability.

20. The system of claim 17, wherein the first device type is the same as the second device type, and wherein the at least one processor is further configured to:
  determine a second probability of the second content being of a video genre conditional on the audience group using the first device type at the time,
  wherein the probability is based on the second probability.

\* \* \* \* \*